United States Patent
Ozawa et al.

(10) Patent No.: US 10,354,423 B2
(45) Date of Patent: Jul. 16, 2019

(54) CALCULATING DEVICE, GRAPH DISPLAY METHOD OF CALCULATING DEVICE, AND STORAGE MEDIUM RETAINING GRAPH DISPLAY PROGRAM

(71) Applicant: CASIO COMPUTER CO., LTD., Shibuya-ku, Tokyo (JP)

(72) Inventors: Makoto Ozawa, Tachikawa (JP); Naoki Akae, Fuchu (JP); Hirokazu Tanaka, Fussa (JP); Miki Suzuki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/713,603

(22) Filed: Sep. 22, 2017

(65) Prior Publication Data

US 2018/0089867 A1 Mar. 29, 2018

(30) Foreign Application Priority Data

Sep. 23, 2016 (JP) ................................ 2016-185118

(51) Int. Cl.
*G06T 11/20* (2006.01)
*H04L 29/06* (2006.01)

(52) U.S. Cl.
CPC ........ *G06T 11/206* (2013.01); *G06T 2200/24* (2013.01); *H04L 67/42* (2013.01)

(58) Field of Classification Search
None
See application file for complete search history.

(56) References Cited

U.S. PATENT DOCUMENTS

| 4,472,732 A | * | 9/1984 | Bennett ................... G06T 3/606 348/452 |
| 4,696,054 A | | 9/1987 | Tsugei et al. |
| 5,758,035 A | * | 5/1998 | Tsuneyoshi ......... G06F 15/0225 345/440 |
| 2008/0273036 A1 | * | 11/2008 | Kishimoto ............... G07C 5/00 345/440 |
| 2013/0300740 A1 | | 11/2013 | Snyder et al. |

FOREIGN PATENT DOCUMENTS

| JP | 07146948 A | 6/1995 |
| JP | 11161612 A | 6/1999 |
| JP | 2016045883 A | 4/2016 |
| JP | 2016099976 A | 5/2016 |

OTHER PUBLICATIONS

Australian Office Action dated Aug. 10, 2018 issued in counterpart Australian Application No. 2017232150.

* cited by examiner

*Primary Examiner* — Jeffrey J Chow
(74) *Attorney, Agent, or Firm* — Holtz, Holtz & Volek PC

(57) ABSTRACT

A calculating device includes a receiver-and-transmitter and a processor. The receiver-and-transmitter is configured to communicate with a server. The processor performs processes including: transmitting (i) an increment of an independent variable per one display dot according to a variance range of the independent variable and the number of display dots on a screen, (ii) a function expression of the independent variable, and (iii) the variance range of the independent variable, to the server; receiving coordinate data of each display dot for generating a graph in a graph display range on the screen, from the server; and displaying a graph image generated at each display dot of the graph display range based on the coordinate data.

18 Claims, 9 Drawing Sheets

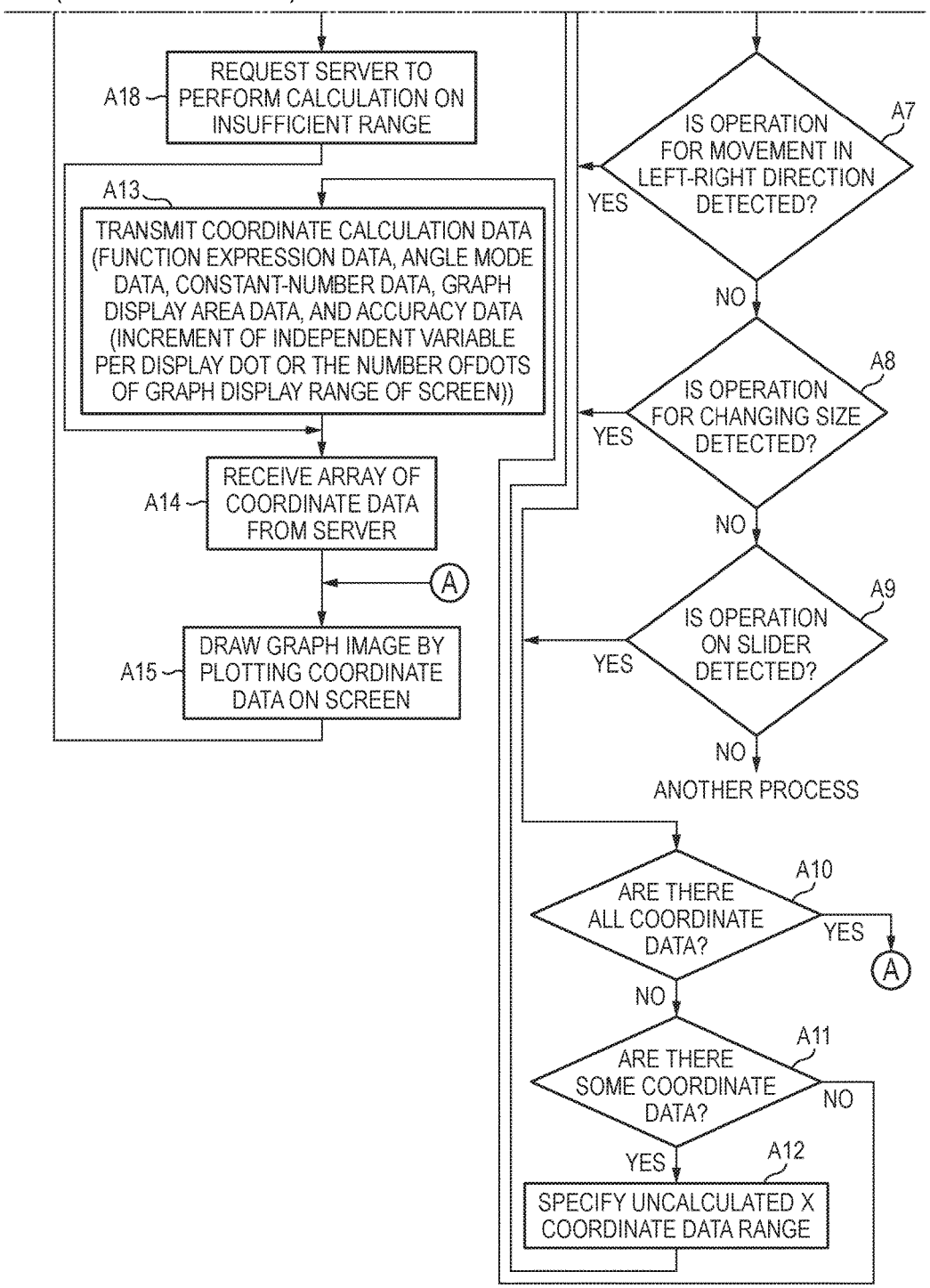

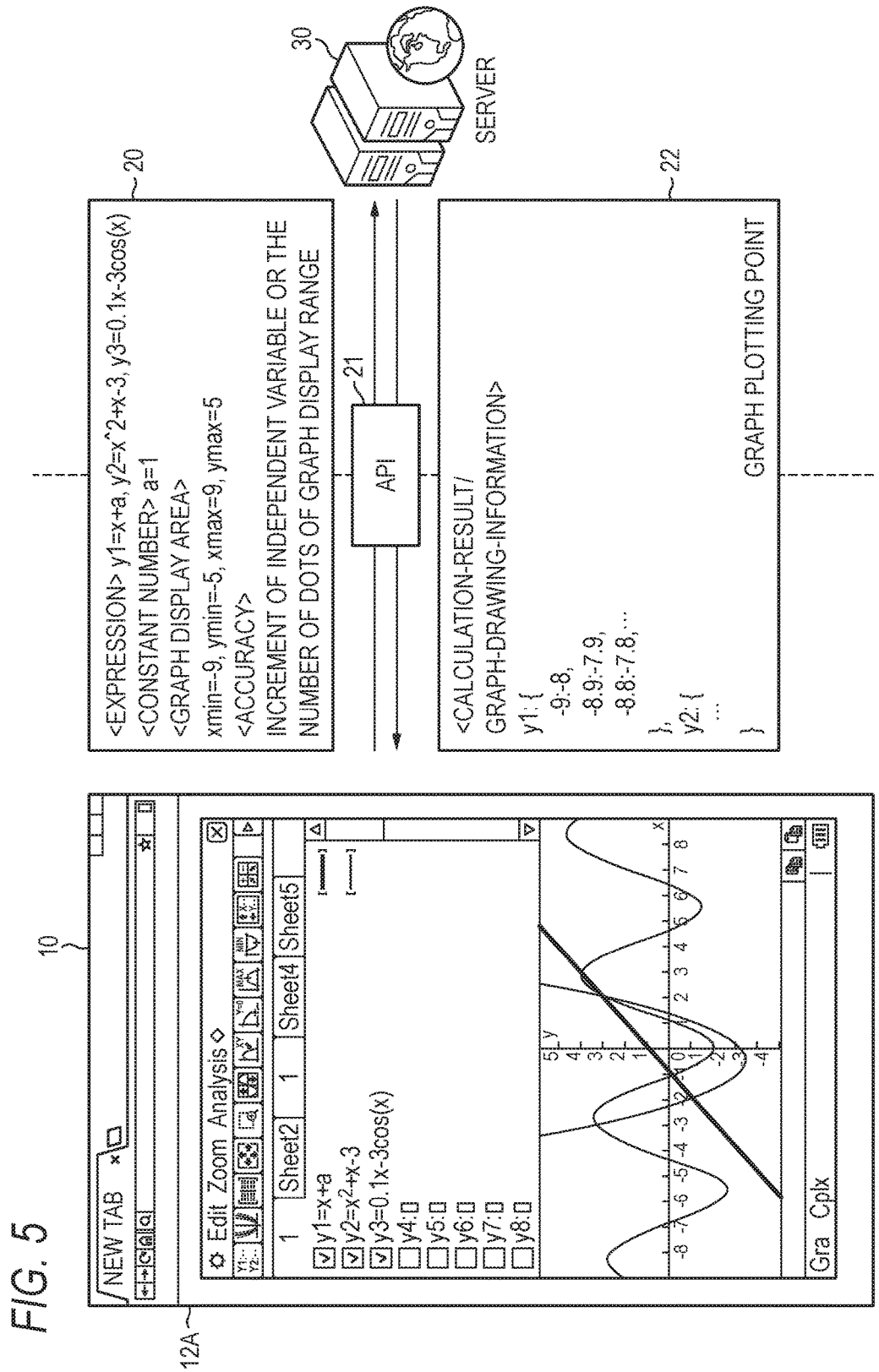

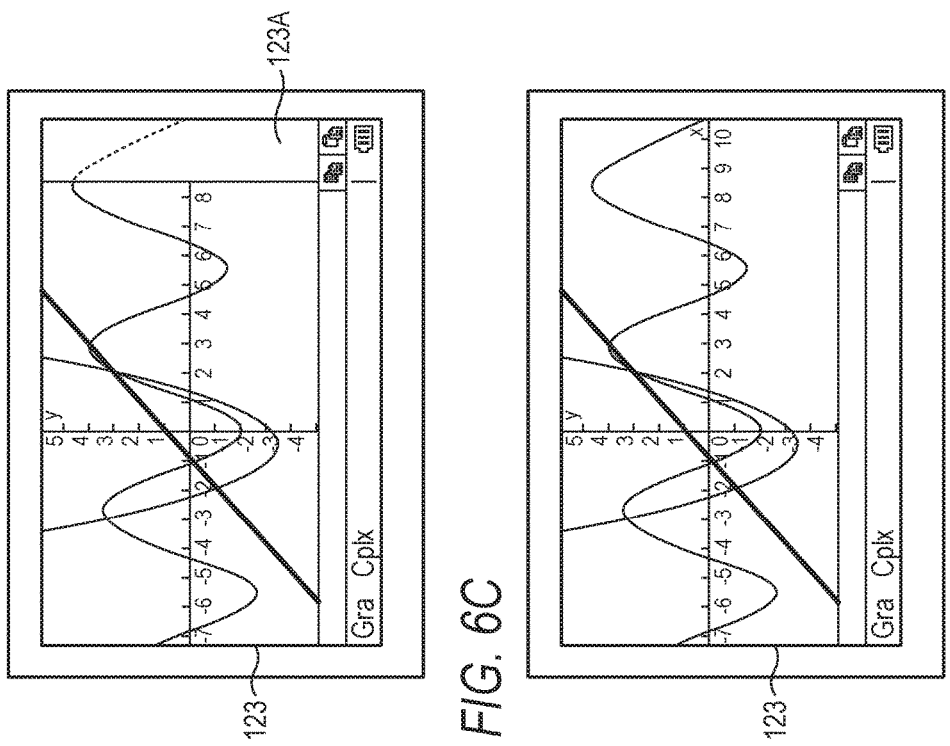
FIG. 6A
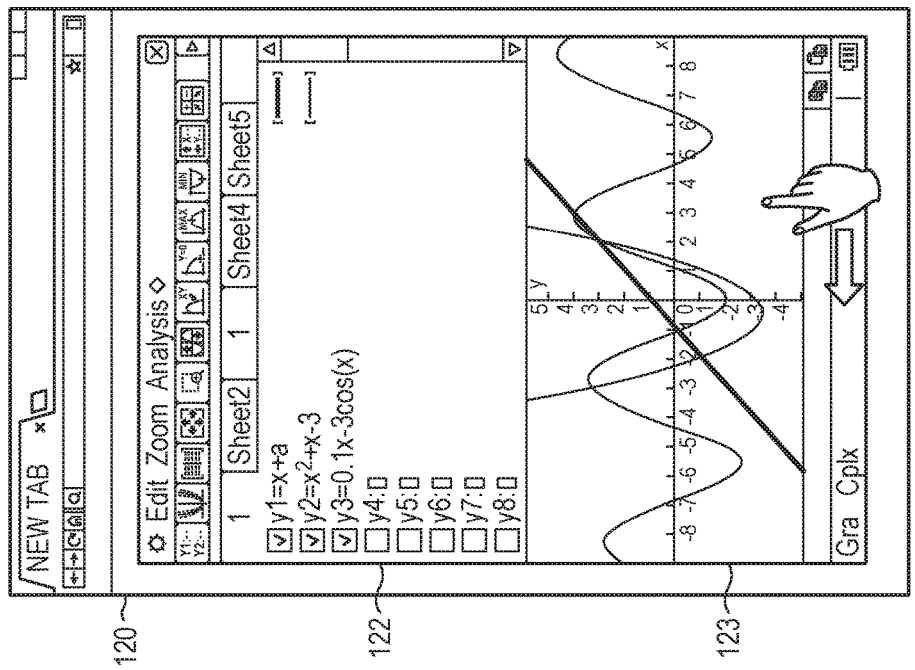
FIG. 6B
FIG. 6C

CALCULATING DEVICE, GRAPH DISPLAY METHOD OF CALCULATING DEVICE, AND STORAGE MEDIUM RETAINING GRAPH DISPLAY PROGRAM

CROSS-REFERENCE TO RELATED APPLICATION

This application is based upon and claims the benefit of priority under 35 USC 119 of Japanese Patent Application No. 2016-185118 filed on Sep. 23, 2016, the entire disclosure of which, including the description, claims, drawings, and abstract, is incorporated herein by reference in its entirety.

BACKGROUND OF THE INVENTION

Field of the Invention

The present invention relates to a calculating device, a graph display method of the calculating device, and a storage medium retaining a graph display program.

Description of the Related Art

In recent years, systems capable of transmitting function expressions from an electronic device such as a smart phone to a dedicated server for calculation, such that the dedicated server calculates the function expressions, and displaying the calculation results on the electronic device have been considered. Since the dedicated server for calculation calculates function expressions, even with respect to a high-level calculation which is complex and has a large load, it is possible to easily obtain the calculation result.

For example, in a system disclosed in Patent Document 1 (JP-A-2016-099976), function expressions are transmitted to a server, such that graph images according to the function expressions are generated as calculation results. An electronic device can receive the graph images from the server, and display the graph images.

As described above, according to the related art, it is possible to transmit function expressions to the server, and receive graph images and display the graph images. However, graph images which are generated in the server are generated regardless of the size of a screen in the electronic device, the size of a graph display area in the screen, the resolution of a display, and so on. Therefore, if graphs received from the server are displayed on the electronic device without change, some highly accurate graphs may not be displayed.

The present invention was made in view of the above-described problem, and an object of the present invention is to provide a calculating device, a graph display method of the calculating device, and a program capable of controlling a server such that the server calculates function expressions, and generating highly accurate graphs in a display screen.

SUMMARY OF THE INVENTION

A calculating device includes a receiver-and-transmitter and processor. The receiver-and-transmitter is configured to communicate with a server. The processor performs processes including: transmitting (i) an increment of an independent variable per one display dot according to a variance range of the independent variable and the number of display dots on a screen, (ii) a function expression of the independent variable, and (iii) the variance range of the independent variable, to the server; receiving coordinate data of each display dot for generating a graph in a graph display range on the screen, from the server; and displaying a graph image generated at each display dot of the graph display range based on the coordinate data.

A calculating device includes a receiver-and-transmitter and a processor. The receiver-and-transmitter is configured to communicate with a server. The processor performs processes including: transmitting (i) the number of display dots on a screen, (ii) a function expression, and (iii) a variance range of an independent variable, to the server; receiving coordinate data of each display dot for generating a graph in a graph display range on the screen, from the server, and displaying a graph image generated at each display dot of the graph display range based on the coordinate data.

According to the present invention, it is possible to control a server such that the serer calculates function expressions, and generate highly accurate graphs in a display screen.

BRIEF DESCRIPTION OF THE DRAWINGS

FIG. 5 is a view for explaining an operation example of the calculating device according to the embodiment.

FIGS. 6A to 6C are views for explaining an operation example of the calculating device according to the embodiment.

DETAILED DESCRIPTION

Hereinafter, an embodiment of the present invention will be described with reference to the accompanying drawings.

Figure 1:
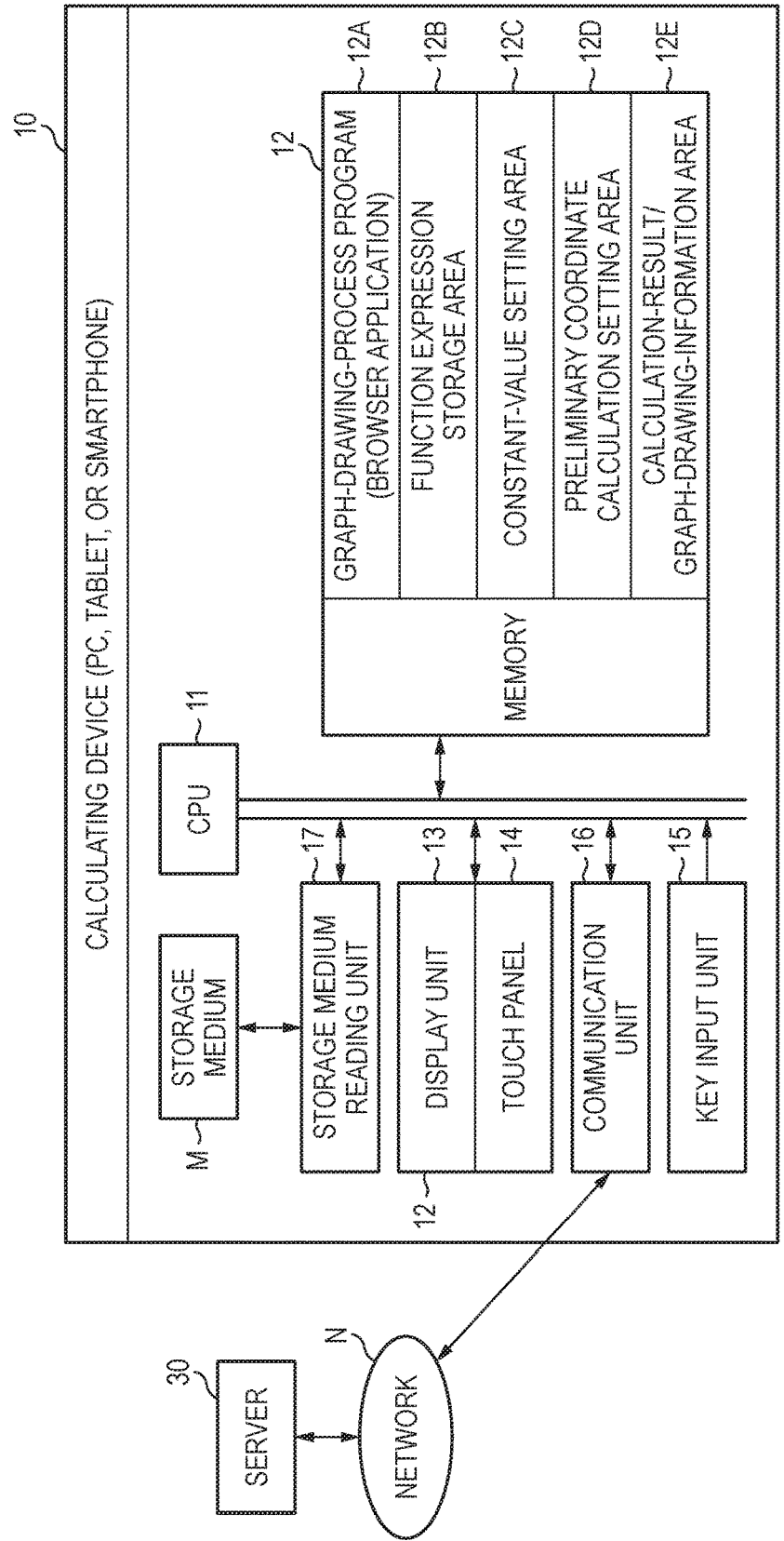
FIG. 1 is a block diagram illustrating an example of the electronic circuit configuration of a calculating device according to an embodiment.

FIG. 1 is a view illustrating an example of the electronic circuit configuration of a calculating device 10 according to the embodiment of the present invention. In the present embodiment, as an example, a case where the calculating device 10 is a smart phone will be described. However, the calculating device 10 is not limited to a smart phone, and may be configured by any other electronic device such as a personal digital assistant (PDA), a personal computer (PC), a tablet terminal, a notebook PC, or a game machine. Here, a system having the calculating device 10 and a server 30 on a communication network N as shown in FIG. 1 will be described as an example.

As shown in FIG. 1, the electronic circuit of the calculating device 10 includes a CPU 11, a memory 12, a display unit 13, a touch panel 14, a key input unit 15, a communication unit (a receiver-and-transmitter) 16, an a storage medium reading unit 17.

According to programs stored in the memory 12, the CPU 11 controls the operations of the individual units of the circuit in response to input signals from the touch panel 14, key input signals from the key input unit 15, or signals received by the communication unit 16. The CPU 11 can execute a graph-drawing-process program (a graph-generating-process program) 12A, thereby controlling the server 30 such that the server performs function expression calculations, and generate highly accurate graphs as the calculation results. The graph-drawing-process program 12A may be downloaded (a web application) by accessing a Web site (a homepage) for function calculation set up by the server 30, or may be stored in the memory 12 in advance, or may be downloaded from a storage medium M such as a memory card into the memory 12 through the storage medium reading unit 17. In the present embodiment, an example in which the graph-drawing-process program 12A may be downloaded by accessing a Web site set up by the server 30 and is controlled by a browser application will be described.

The CPU 11 controls the operations of the individual units of the circuit according to commands described in the graph-drawing-process program 12A, such that software and hardware cooperate with each other, whereby the calculating device 10 implements a graph drawing process (graph generating process, a graph display method) to be described in the following operation description.

In the memory 12, programs executable by the CPU 11, and data are stored. Besides a basic program (an operating system (OS)) and a browser application program, various programs are stored in the memory 12. In programs which are stored in the memory 12, the graph-drawing-process program 12A is included. Also, according to execution of the graph-drawing-process program 12A, a function expression storage area 12B for storing function expression data as temporal data, a constant-value storage area 12C for storing displacement ranges and current values of constants included in function expressions, a preliminary coordinate calculation setting area 12D for storing setting contents set by a preliminary coordinate calculation setting process (to be described below), a calculation-result/graph-drawing-information area (a calculation-result/graph-generating-information area) 12E for storing calculation-result/graph-generating-information received from the server 30, and the like are secured in the memory 12.

The display unit 13 displays images according to processes performed by the CPU 11, on a display screen. The display unit 13 is configured by, for example, a dot matrix type liquid crystal display unit. The touch panel 14 inputs position data according to touch operations using a user's hand, a pen, or the like. The touch panel 14 is superimposed on the display screen of the display unit 13, and is integrated with the display unit. The display unit 13 and the touch panel 14 constitute a touch panel display.

The key input unit 15 receives key operations on various keys.

The communication unit 16 has a function of accessing the network N through a public wireless telephone network.

In a case where the calculating device 10 requires the server 30 to perform function expression calculation (including graph generating), the server performs the calculation process based on function expressions received from the calculating device 10 and function-expression/graph information related to graph generating. The server 30 performs calculation processes using a higher level of function expression calculation program than programs which are executed by the calculating device 10, or a special calculating circuit (module) configured to be able to perform high-level calculations. Therefore, even with respect to high levels of complex function expressions which it is difficult to calculate in the calculating device 10, the server 30 can accurately obtain the calculation results.

Figure 2:
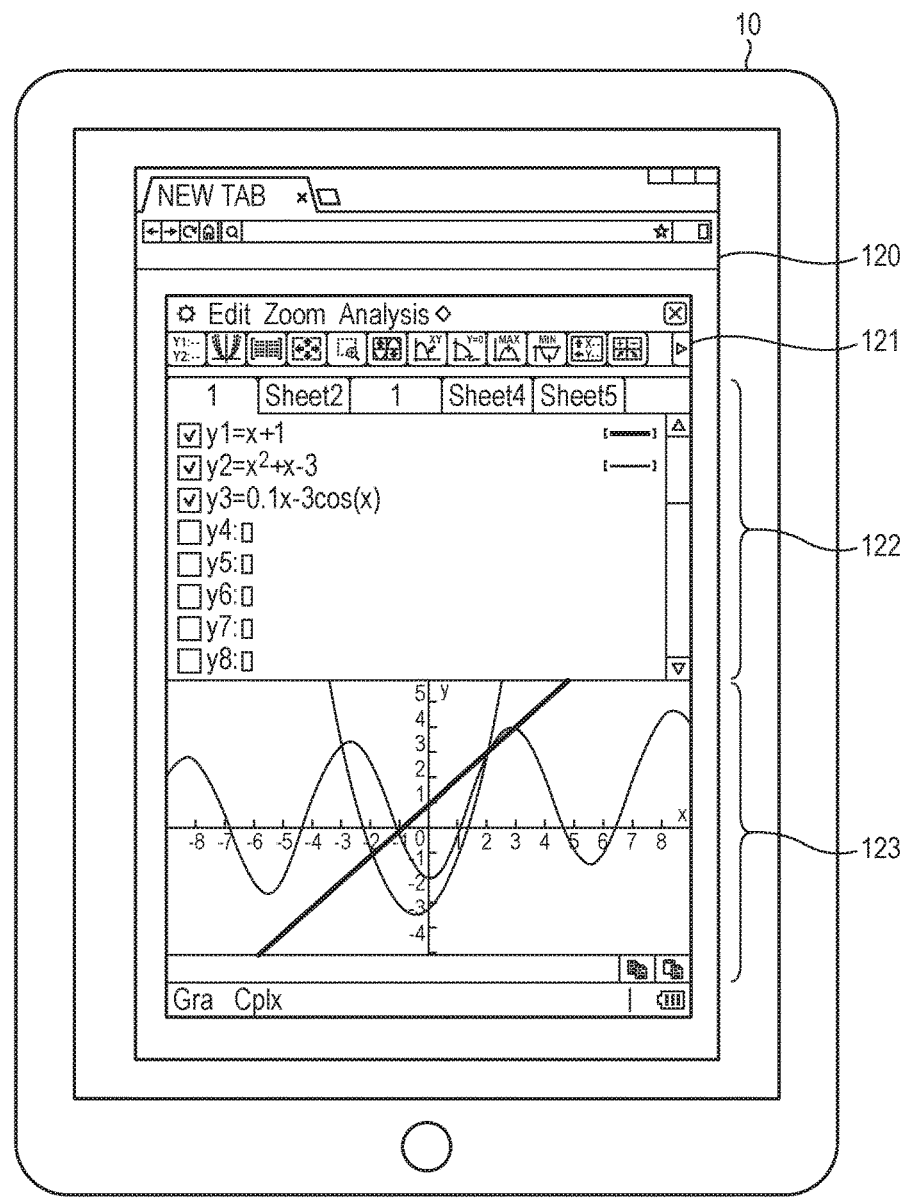
FIG. 2 is a view illustrating a display screen example of the calculating device according to the embodiment.

FIG. 2 is a view illustrating a display screen example of the calculating device 10 according to the present embodiment.

The calculating device 10 reads the graph-drawing-process program 12A, for example, by accessing a Web site for function calculation set up by the server 30, by a browser application, and executes the graph-drawing-process program 12A on the browser application. The graph-drawing-process program 12A displays an image for function calculation on a browser window 120 by operating in cooperation with a programming language which operates on a browser.

The graph-drawing-process program 12A displays, for example, a command icon area 121, a function expression area 122, and a graph image area 123, as an image for function calculation, as shown in FIG. 2.

In the command icon area 121, icons corresponding respectively to a plurality of commands are arranged. Each icon can be selected to perform a function according to the corresponding icon. Examples of functions which can be performed by operating icons include function expression input, graph display, coordinate value list display, graph area change (expansion or reduction), and graph range designation/expansion (zoom-in).

In the function expression area 122, a function expression (y=f(x)) having an independent variable (for example, x) can be input by user's operations. In the function expression area 122, a plurality of function expressions (such as y1 and y2) can be input, and the types of graph display lines corresponding respectively to the plurality of function expressions are displayed. Also, in the function expression area 122, with respect to each of input function expressions, it is possible to set whether to set the corresponding function expression as a graph generating object.

In a case of inputting function expressions in the function expression area 122, for example, a software keyboard for inputting function expressions is displayed. In the software keyboard, for example, keys of "0" to "9" (digits), keys of "+", "−", "×", and "÷" (four basic operation symbols), an "=" (execution) key, and so on are arranged. Also, as a group of function keys for arithmetic functions, an "$x^{-1}$" (x to the negative one power, the reciprocal of x) key, a "$\sqrt{\square}$" (root) key, a "$\square/\square$" (fraction) key, a "sin" (sine) key, a "cos" (cosine) key, and so on are arranged.

The graph image area 123 shows a graph display range in which graphs can be generated on the screen of the display unit 13. If some of function expressions input in the function expression area 122 are set as graph generating objects, graphs corresponding to the graph generating objects are generated in the graph image area 123. Graphs corresponding to a plurality of function expressions can be displayed such that the graphs can be identified by different line types or different display colors, respectively. In the graph image area 123, it is possible to change the graph display range by a user's operation. As change of the graph display range, for example, graph area change to expand or reduce the whole area, graph display object change to move the graph display object range in a transverse direction or a longitudinal direction, and the like are possible. For example, it is possible to instruct change of the graph display object range by a user's touch operation (for example, a slide operation) on the touch panel 14 corresponding to the graph image area 123.

Figure 3:
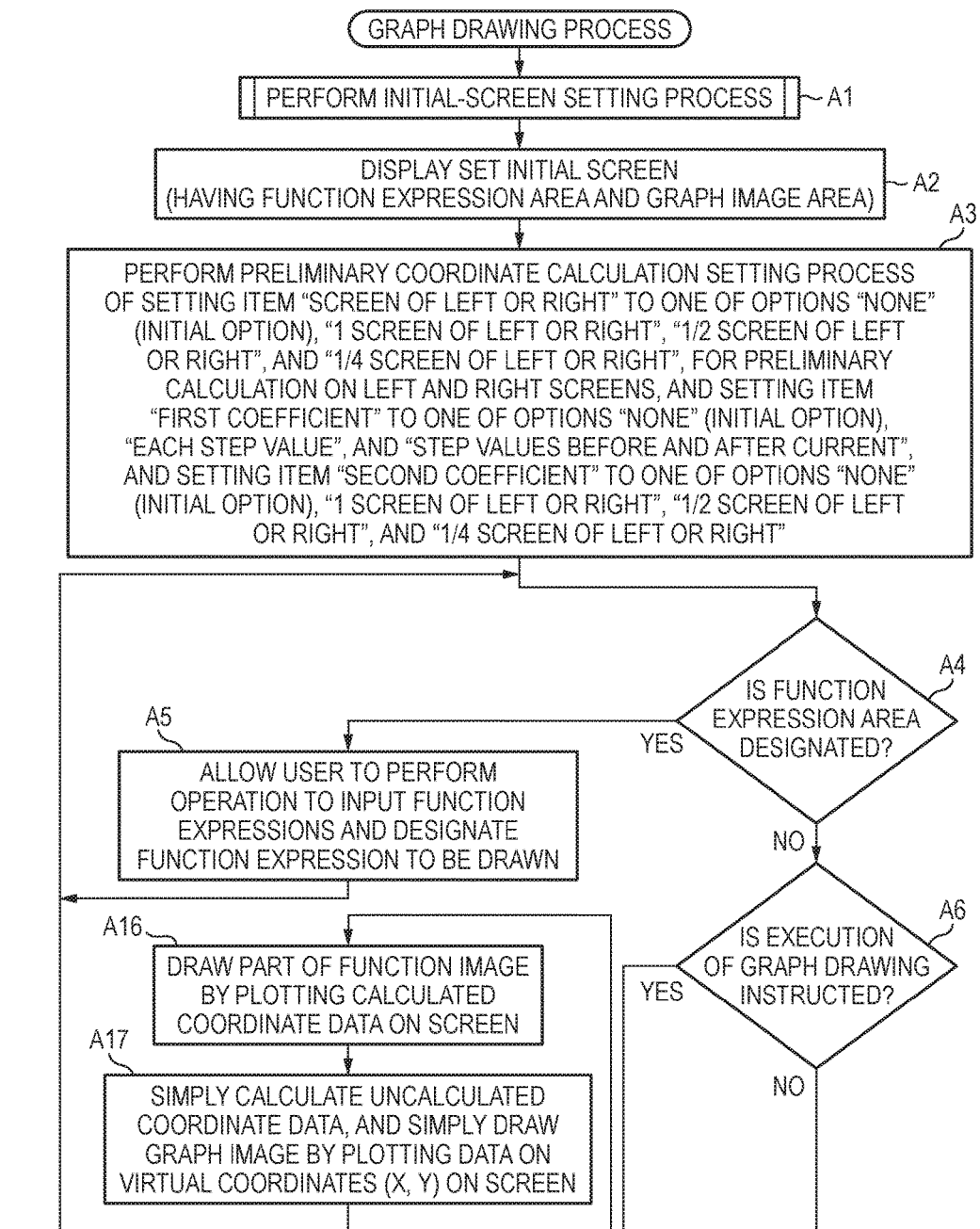
FIG. 3 is a flow chart illustrating an operation of the calculating device according to the embodiment.
Figure 4:
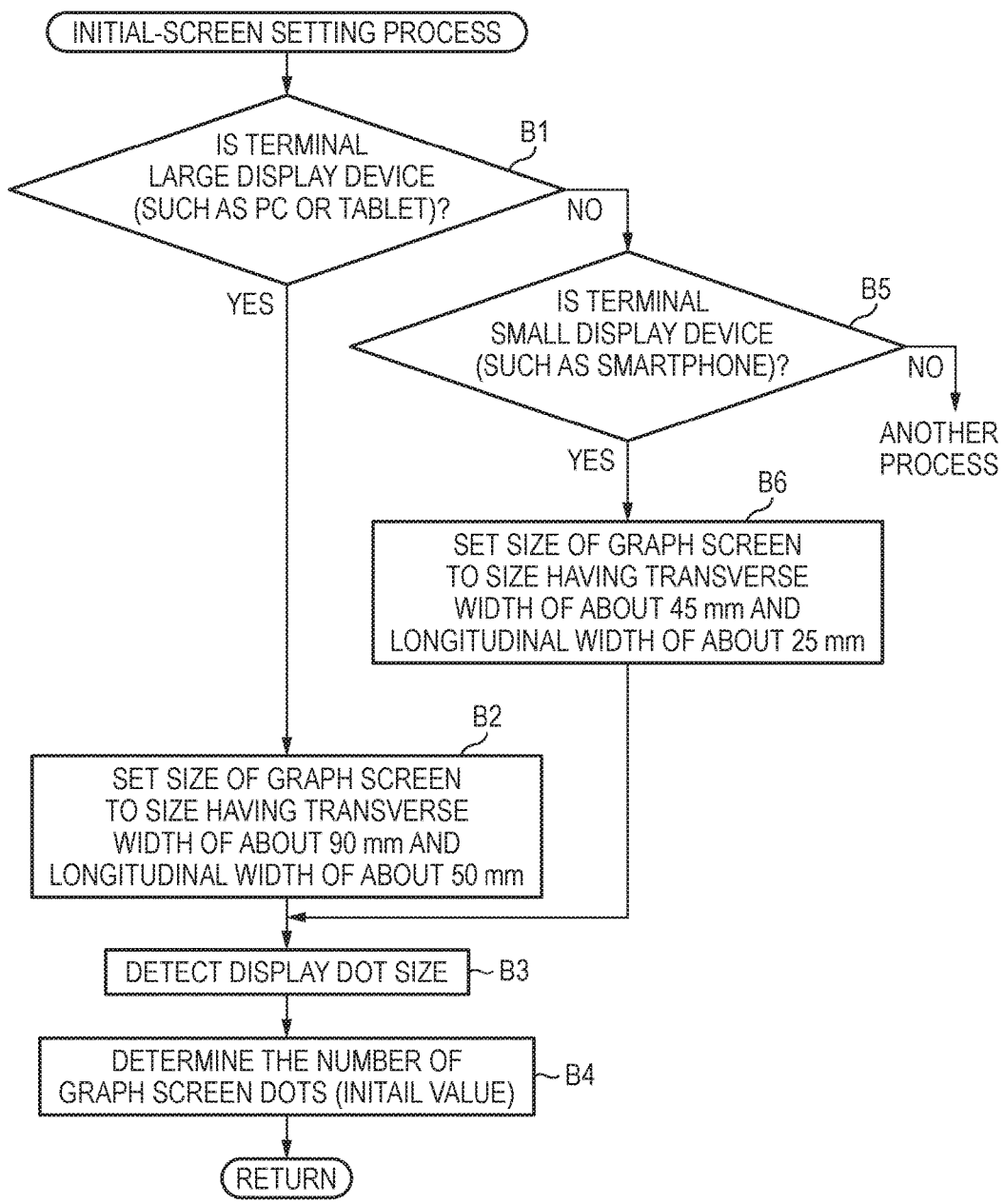
FIG. 4 is a flow chart illustrating an operation of the calculating device according to the embodiment.

Now, operations of the calculating device 10 according to the present embodiment will be described. FIGS. 3 and 4 are flow charts illustrating operations of the calculating device 10 according to the present embodiment. Also, FIGS. 5 to 8B are views for explaining operation examples of the calculating device 10 according to the present embodiment.

In response to a user's operation, the calculating device 10 accesses the Web site (the homepage) for function calculation set up by the server 30, by the browser application. As a result, in the calculating device 10, the graph-drawing-process program 12A is activated.

According to the graph-drawing-process program 12A, in STEP A1, the CPU 11 performs an initial-screen setting process.

FIG. 4 is a flow chart illustrating the initial-screen setting process.

The CPU 11 determines whether the calculating device is a large display device (for example, a PC or a tablet terminal) equipped with a display unit 13 having a relatively large size, or a small display device (for example, a smart phone) equipped with a display unit 13 having a relatively small size.

In a case of determining that the calculating device is a large display device ("Yes" in STEP B1), in STEP B2, the CPU 11 sets the graph screen size for displaying graphs in the display screen of the display unit 13, to a size set in advance for the large display device. For example, it is assumed that the graph screen size for the large display device has been set to a size having a transverse width of 90 mm and a longitudinal width of 50 mm. Meanwhile, in a case of determining that the calculating device is a small display device ("Yes" in STEP B5), in STEP B6, the CPU 11 sets the graph screen size for displaying graphs in the display screen of the display unit 13, to a size set in advance for the small display device. For example, it is assumed that the graph screen size for the small display device has been set to a size having a transverse width of 45 mm and a longitudinal width of 20 mm.

Also, the CPU 11 may adjust the graph screen size such that plotting positions of graph generating according to results obtained by function expression calculation of the server 30 represent simple coordinate positions without fractions.

In STEP B4, the CPU 11 detects the display dot size (resolution) of the display unit 13 installed in the calculating device, based on the graph screen size, and determines the number of graph screen dots (an initial value) corresponding to the preset graph screen size.

In STEP A2, the CPU 11 controls the display unit 13 such that the display unit displays an initial screen (the function expression area 122 and the graph image area 123) according to options set by the initial-screen setting process. The graph image area 123 is displayed according to the number of graph screen dots which is the initial value set by the initial-screen setting process.

After the calculation results obtained by the server 30 are displayed in the graph image area 123 (the graph display range), subsequently, in STEP A3, the CPU 11 performs a preliminary coordinate calculation setting process for controlling the server 30 such that, in case of change in the graph display range and constants included in the function expressions, the server performs a calculation process including calculation after the change. In the preliminary coordinate calculation setting process, a setting screen including items such as "SCREEN OF LEFT OR RIGHT", "FIRST CONSTANT", and "SECOND CONSTANT" is displayed, and with respect to each item, an option is set according to a user's operation. In the preliminary coordinate calculation setting process, a setting content for requiring the server 30 to generate coordinate data with respect to a graph having a range exceeding the current graph display range, or the graph of a function expression having a changed constant is included.

The item "SCREEN OF LEFT OR RIGHT" is an item for setting whether to control the server 30 such that in case of change of the graph display range in the transverse direction, the server performs calculation over the changed range in advance. For example, during initial setting, an option "NONE" for controlling the server such that the server performs calculation only over the graph display range is set.

Also, for example, one of options "ONE SCREEN OF LEFT OR RIGHT", "½ SCREEN OF LEFT OR RIGHT", and "¼ SCREEN OF LEFT OR RIGHT" can be selected. For example, the option "ONE SCREEN OF LEFT OR RIGHT" can be set to control the server such that the server performs calculation on a range (an independent-variable variance range) which is on the left or right side from the current graph display range and has the same width as that of the graph display range. Similarly, the option "½ SCREEN OF LEFT OR RIGHT" can be set to control the server such that the server performs calculation on same ranges (an independent-variable variance range) which is on the left and right from the current graph display range and has half of the width of the graph display range.

The item "FIRST CONSTANT" is an item for setting whether to control the server 30 such that, in a case where a constant (for example, a constant "a") is included in a function expression, the server performs calculation on some changed ranges in case the value of the constant is changed. For example, during initial setting, an option "NONE" for controlling the server such that the server performs calculation only on the function expression in which the variable has an initial value (for example, a=1).

Also, for example, one of options "EACH STEP VALUE" and "STEP VALUES BEFORE AND AFTER CURRENT" can be selected. For example, the option "EACH STEP VALUE" can be set to control the server such that the server performs calculation on a plurality of function expressions obtained by change to each of values (for example, integer values) usable as a variable in the graph display range. The option "STEP VALUES BEFORE AND AFTER CURRENT" can be set to control the server such that the server performs calculation on two function expressions obtained by change to each of values (for example, integer values) before and after the current value (initial value) of a variable.

The item "SECOND CONSTANT" is an item for setting whether to control the server 30 such that, in case a second constant (for example, a constant "b") is included in a function expression, the server performs calculation on some changed ranges in case the value of the constant is changed. For example, during initial setting, an option "NONE" for controlling the server such that the server performs calculation only on the function expression in which the variable has an initial value (for example, b=1).

Also, in the above description, during initial setting, the preliminary coordinate calculation setting process is performed; however, during execution of the graph-drawing-process program 12A, for example, in response to selection of a predetermined icon (option) in the command icon area 121, the preliminary coordinate calculation setting process can be performed at an arbitrary timing.

Also, although the case of changing the graph display range (the range of an independent variable "x") in the transverse direction has been described, in a case where it is possible to change the graph display range (the range of an independent variable "y") in the longitudinal direction, the setting screen may be configured such that options in case of change in the longitudinal direction can be set. For example, an item "SCREEN OF UPPER OR LOWER SIDE" is provided such that it is possible to select any one of options "ONE SCREEN OF UPPER OR LOWER SIDE", "½ SCREEN OF UPPER OR LOWER SIDE", and "¼ SCREEN OF UPPER OR LOWER SIDE".

Subsequently, if the function expression area 122 is designated in the browser window 120 ("Yes" in STEP A4), in STEP A5, the CPU 11 displays, for example, a software keyboard for inputting function expressions, and if the user inputs a function expression by operating the software keyboard, the CPU 11 stores data on the function expression in the function expression storage area 12B, and displays the function expression in the function expression area 122. In the function expression area 122, checkboxes are provided for input function expressions, respectively, such that it is possible to set each input function expression as a graph generating object by selecting a corresponding checkbox. For each graph generating object, an initial value is set.

After at least one function expression is input, if performance of graph drawing (graph generating) is instructed ("Yes" in STEP A6), the CPU 11 determines whether there are coordinate data (graph generating information) on all of graphs to be displayed, with respect to the current function expression area 122, i.e., whether the server 30 has completed calculation relative to graphs which are display objects.

In a case where there are not all coordinate data (graph generating information) for displaying the graphs in the graph generating ("NO" in both of STEPS A10 and A11), in STEP A13, the CPU 11 transmits coordinate calculation data for making the server perform function expression calculation for graph generating, to the server 30.

FIG. 5 is a view illustrating data communication which is performed in a case when the calculating device 10 according to the present embodiment requires the server 30 to perform calculation for graph generating.

As shown in FIG. 5, the calculating device 10 transmits coordinate calculation data 20 according to function expressions input in the function expression area 122, to the server 30. Here, for example, it is assumed that three function expressions (y1, y2, and y3) have been input in the function expression area 122 by user's operations. As the coordinate calculation data 20 of the calculating device 10, function expression data representing the three function expressions, graph display area data representing an independent-variable variance range for graphs to be displayed in the graph display range, accuracy data representing graph generating accuracy corresponding to the graph display range on the screen of the display unit 13 (the an increment of each independent variable corresponding to one display dot, or the number of dots of the graph display range (the independent-variable variance range) on the screen) are included.

The graph display area data includes, for example, a maximum value (max) and a minimum value (min) of an x coordinate system, and a maximum value (max) and a minimum value (min) of a y coordinate system. For example, the coordinate calculation data 20 shown in FIG. 5 represents that the graphs should be generated in a range having −9, −5, 9, and 5 as the minimum x value, the minimum y value, the maximum x value, and the maximum y value, respectively. In other words, the graphs of the function expressions corresponding to the independent-variable variance range (x from −9 to 9) are generated with respect to the graph display range (the transverse direction of the graph window).

The accuracy data represents an increment of the independent variable corresponding to one display dot, or the number of display dots corresponding to the graph display range (the independent-variable variance range) on the screen. In the graph image area 123, since the graph display range can be arbitrarily changed by a user's operation, the number of display dots corresponding to the independent-variable variance range, or the number of display dots corresponding to the graph display range changes. Also, according to the resolution of the display unit 13 (for example, a dot matrix type liquid crystal display unit) installed in the calculating device 10, for example, a part of a graph having a size of one pixel by one pixel may be generated by two dots by two dots, or three dots by three dots. Therefore, when performance of graph generating is required, the CPU 11 calculates accuracy data (an increment of the independent variable corresponding to one dot, or the number of dots of the graph display range (the independent-variable variance range) on the screen) representing graph generating accuracy according to the resolution (the number of display dots corresponding to one pixel) of the display unit 13 installed in the calculating device 10, and transmits the accuracy data to the server 30.

Also, in a case where a function expression includes calculation of a trigonometric function or an angle, angle mode data designating an angle mode (a degree mode, a radian mode, or a gradian mode) is included in the coordinate calculation data 20. Also, in a case where a function expression includes a constant, constant data is included in the coordinate calculation data 20. In the constant data, for example, a constant displacement range representing values to which the constant value can be displaced and the current value (initial value) of the constant are included. Further, in the coordinate calculation data 20, the option content set by user's operations in the preliminary coordinate calculation setting process is included. In this option content, a content requiring calculation on a range exceeding the current graph display range or calculation of the value of a function having a changed constant value is included.

The server 30 (the function expression calculation program) receives the coordinate calculation data 20 from the calculating device 10 through an application programming interface (API) 21, and performs calculation of the function expressions, and generates calculation-result/graph-generating-information for generating the graphs in the calculating device 10.

Also, in a case where an option other than the initial option ("NONE") has been set in the item "SCREEN OF LEFT OR RIGHT" in the preliminary coordinate calculation setting process, the server 30 performs calculation on the range positioned on the left or right side from the current graph display range. Similarly, in a case where the items "FIRST CONSTANT" and "SECOND CONSTANT" are have been set to options other than their initial options ("NONE") in the preliminary coordinate calculation setting process, the server 30 performs calculation including a case where the values of the constants have been changed.

The server 30 transmits calculation-result/graph-drawing-information (calculation-result/graph-generating-information) 22 generated by calculation based on the coordinate calculation data 20, to the calculating device 10. The calculating device 10 stores the calculation-result/graph-generating-information 22 in the calculation-result/graph-drawing-information area 12E.

The CPU 11 of the calculating device 10 receives the arrangements of the coordinate data for graph drawing (graph generating) included in the graph generating information 22, in STEP A14, and draws (generates) the graphs based on the coordinate data arrangements in the graph image area 123, in STEP A15. As shown in FIG. 5, the coordinate data are expressed by combinations (pairs) of x coordinate values and y coordinate values of individual plotting positions representing each graph. The CPU 11 can perform plotting on pixels corresponding to the coordinate data included in the arrangements, thereby drawing (generating) a graph image.

Also, in a case where a plurality of function expression data items is transmitted by the coordinate calculation data 20, the calculating device receives coordinate data arrangements corresponding to the individual function expression data items, and generates the graphs of the function expressions, for example, by different types of lines.

The calculation-result/graph-generating-information 22 is generated by high-level calculation of the server 30. In other words, the coordinate data for graph generating represents positions which the graphs should be plotted in the graph image area 123 (the graph display range) of the display unit 13 generated based on the function expression data, the graph display area data, and the accuracy data included in the coordinate calculation data 20. In other words, since the coordinate data of the graphs is generated based on the increment (a pitch) of the number of display dots corresponding to the displacement of the independent variable in the current graph image area 123 (the graph display range), or the number of display dots corresponding to the graph display range (the whole of the independent-variable variance range) on the screen, according to the display unit 13 installed in the calculating device 10, it is possible to accurately generate the graphs on the screen of the display unit 13 of the calculating device 10. Therefore, even in a case where complex function expressions are input, it is possible to generate accurate graphs as calculation results.

Now, a case of changing the graph display range displayed in the graph image area 123 will be described.

FIGS. 6A to 6C show an example in which the graph display object range in the transverse direction by a user's slide operation on the graphs, as an example of change of the graph display object range in the present embodiment.

FIG. 6A shows a state where the graphs have been generated in the graph image area 123 in the above-described way. Here, it is assumed that the user has performed a slide operation (an operation to move the screen in the transverse direction) on the graphs displayed in the graph image area 123. If the slide operation is detected by the touch panel 14, that is, if it is detected that an operation to change the graph display range has been performed ("Yes" in STEP A7), the CPU 11 moves the graph display range according to the operation amount (slide length) of the slide operation. For example, in FIG. 6A, since the slide operation to the left is performed, according to the operation amount, the graph display range changes to a right range.

The CPU 11 determines whether there is calculated coordinate data (the calculation-result/graph-generating-information 22) throughout the changed graph display range. In other words, if the item "SCREEN OF LEFT OR RIGHT" has been set to an option other than the initial option ("NONE") in the preliminary coordinate calculation setting process, the CPU determines whether coordinate data (calculation-result/graph-generating-information 22) of a range positioned on the right or left side with respect to the current graph display range have been received.

In a case where all of the calculated coordinate data of the changed graph display range have been received ("Yes" in STEP A10), in STEP A15, the CPU 11 draws (generates) the graphs based on the coordinate data arrangements in the graph image area 123.

Meanwhile, in a case where there is calculated coordinate data in a part of the graph display range, in STEP A12, the CPU 11 specifies a range where there is no coordinate data, as a new calculation object. In STEP A16, with respect to the part of the graph display range where there is the calculated coordinate data, the CPU 11 draws (generates) parts of the graphs based on the coordinate data arrangements in the graph image area 123, and displays a simple graph area in the graph image area 123 where there is no coordinate data. Further, in STEP A17, the CPU 11 simply calculates the function expressions with respect to the uncalculated range, thereby drawing (generating) virtual coordinate data of the graphs, and performs plotting on the simple graph area based on the virtual coordinate data, thereby simply generating a graph image.

FIG. 6B shows an example in which the graph display range is changed with respect to the graphs displayed in the graph image area 123 shown in FIG. 6A. As shown in FIG. 6B, since the graph display range is moved to the right, a simple graph area 123A is provided on the right side of the graphs displayed in the graph image area 123. In the simple graph area 123A, graphs are simply generated based on virtual coordinate data generated by simple calculation. During simple generating of the graphs, the graphs need to be displayed in a form different from the form of the graphs generated in the graph image area 123. For example, they can be plotted in broken lines or dotted lines, or can be plotted in a different display color.

In the simple graph area 123A, graph generating which is not highly accurate need to be performed. In other words, the number of coordinates to be plotted during simple generating needs to be set to be smaller than that for the graphs in the normal graph image area 123, and with respect to the coordinates to be plotted, errors in a predetermined range need to be allowed. In this way, simple calculation reduces the processing load. Therefore, it is possible to easily perform simple generating in the simple graph area 123A. Since simple graphs are displayed in the simple graph area 123A, the user can recognize that highly accurate calculation using the server 30 is being performed.

In STEP A18, with respect to the range having insufficient coordinate data specified in STEP A12, the CPU 11 transmits coordinate calculation data 20 according to the changed graph display range (an update of the graph display area data), to the server 30, thereby requesting the server 30 to perform calculation. The server 30 performs calculation in response to the request from the calculating device 10, and transmits the calculation results (calculation-result/graph-generating-information 22) to the calculating device 10.

Then, the server 30 may transmit the coordinate data of the range in which it is necessary to newly display graphs, or may newly transmit the coordinate data of the whole of the changed graph display range. Also, the server may perform calculation including a range corresponding to the option content set during the preliminary coordinate calculation setting, according to the changed graph display range, and transmit the calculation-result/graph-generating-information 22.

Also, in the present embodiment, the independent-variable variance range is set so as to surely fall within the graph display range on the screen; however, the present invention can be implemented in such a way that the independent-variable variance range is set to exceed the display range. In this case, with respect to a graph display range having a size by which the independent-variable variance range extends outside the actual graph display range on the screen, it is needed only to detect the number of display dots. For example, in a case where the independent-variable variance range has been set to such a size that the variance range extends to each of the left and right sides from the display range by half the display range, the number of display dots which is twice the number of actual display dots is detected.

The CPU 11 receives the calculation-result/graph-generating-information 22 (the coordinate data arrangements for graph generating) received from the server 30, in STEP A14, and draws (generates) the graphs based on the coordinate data arrangements in the graph image area 123 (the simple graph area 123A), in place of the simple graph area 123A, in STEP A15. FIG. 6C shows a state where the graphs have been generated based on the calculation results of the server 30. As shown in FIG. 6C, based on the calculation results of the server 30, it is possible to generate highly accurate graphs as described above.

Also, in the above description, the example in which the graph display range of the graph image area 123 is moved in the transverse direction; however, the calculating device may be configured such that the graph display range can be moved in the longitudinal direction.

Figure 7A:
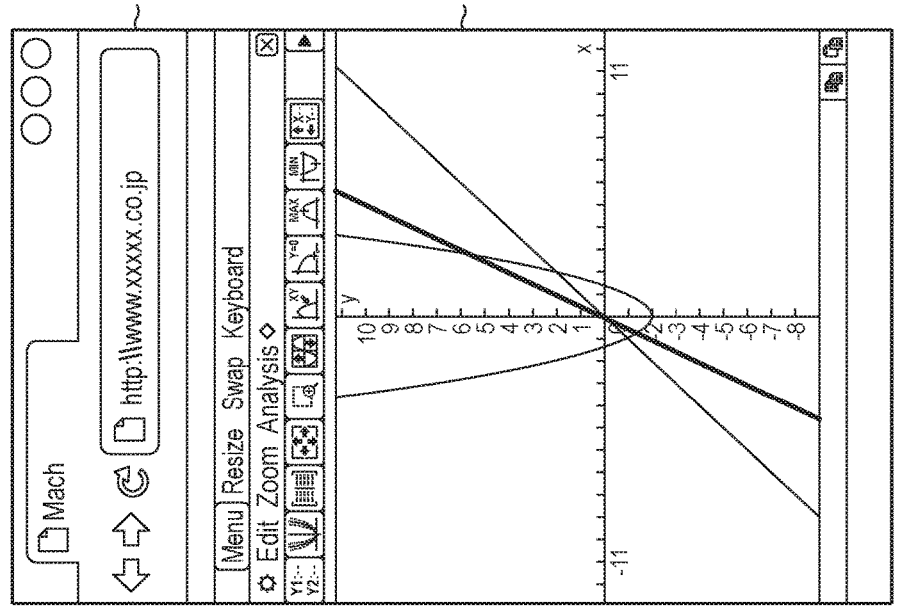
FIGS. 7A and 7B are views for explaining an operation example of the calculating device according to the embodiment.

FIGS. 7A and &B show an example in which the size of the graph image area 123 is changed, as an example of change of the graph display object range in the present embodiment. Here, change of the size of the graph image area 123 represents change of the independent-variable variance range (the maximum values and the minimum values of the display object range in the x and y coordinate systems), not expansion or reduction of graphs.

Figure 7B:
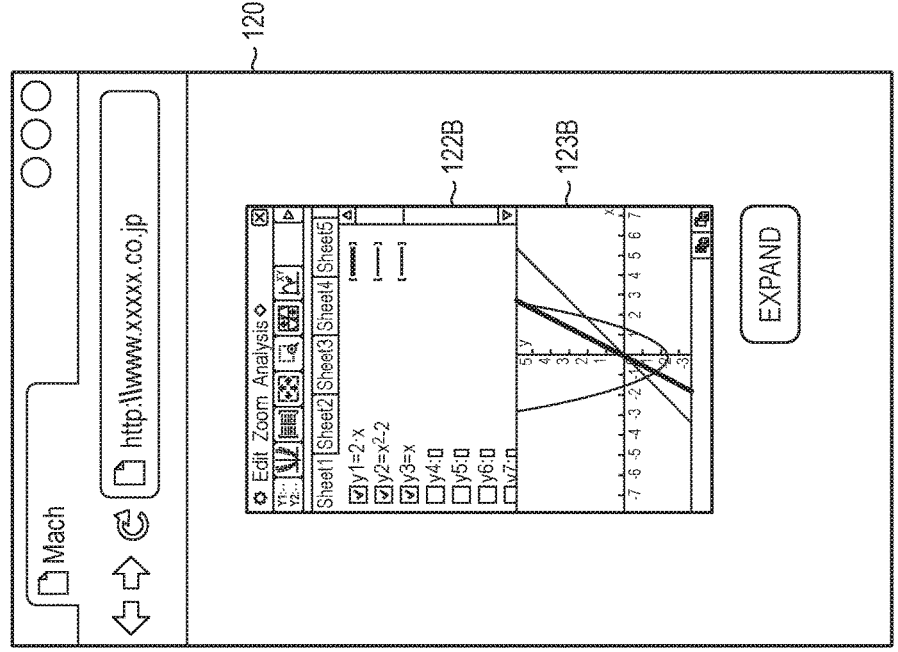

FIG. 7A shows a display example in which the size of a graph image area 123B is small, and FIG. 7B shows a display example in which the size of a graph image area 123C is large. With respect to the graph image area 123B or 123C, change of the size can be instructed by, for example, a pinch-in (reduction) operation or a pinch-out (expansion) operation on the touch panel 14 by the user, an instruction using a command (a command icon), or an operation on a mouse pointer or the like. In the display example shown in FIG. 7B, the size of the graph image area 123C is large due to deletion of the function expression area.

In a case of detecting that a user's operation to change the size of the graph image area 123 has been performed ("Yes" in STEP A8), the graph display range is changed according to the size change amount (expansion or reduction). Also, in the process which is performed in a case of performing size change, the range to be the object of calculation of the server 30 is changed not only in the x coordinate direction but also in the y coordinate direction, and the other process is performed in the same way as that in the above-described case of changing the graph display range in the transverse direction, and thus a detailed description thereof will not be made (STEPS A10 to A18).

Also, with reference to the example shown in FIGS. 7A and 7B, the example in which the independent-variable variance range is changed has been described; however, even in a case of expanding (zooming in) graphs, the same process can be performed. For example, the calculating device transmits magnification of expansion (zoom-in) of a part of the variation range (the variance range) for displaying the graphs, as the coordinate calculation data 20, to the server 30, such that the server performs calculation. The server 30 generates coordinate data arrangements representing parts (intermediate values between the coordinate data previously received) necessary to display the zoomed graphs, according to the magnification of expansion (zoom-in), and transmits the coordinate data arrangements to the calculating device 10. As a result, the calculating device 10 can generate the expanded (zoomed) graphs based on the coordinate data arrangements received from the server 30.

Figure 8A:
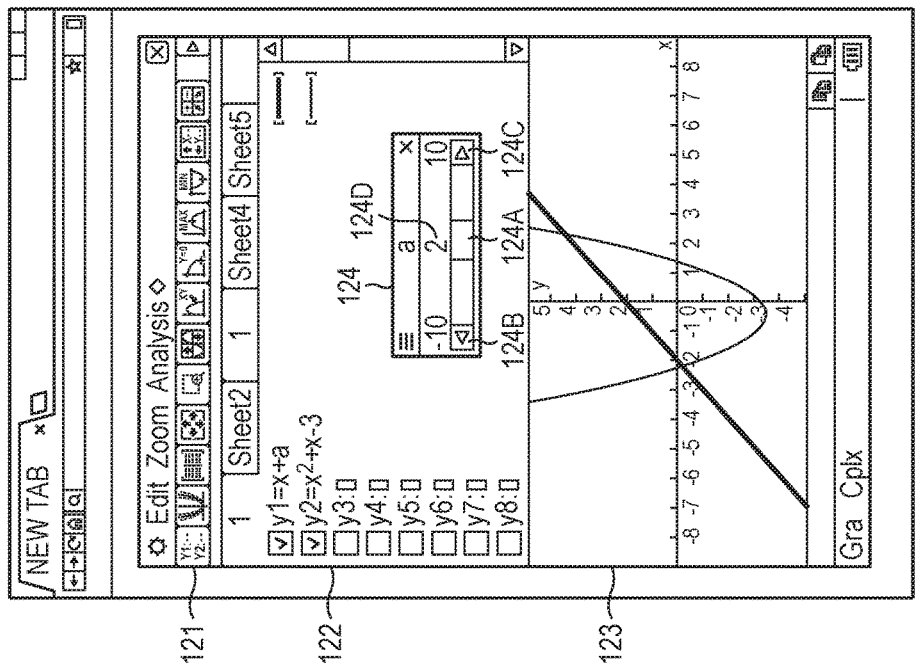
FIGS. 8A and 8B are views for explaining an operation example of the calculating device according to the embodiment.
Figure 8B:
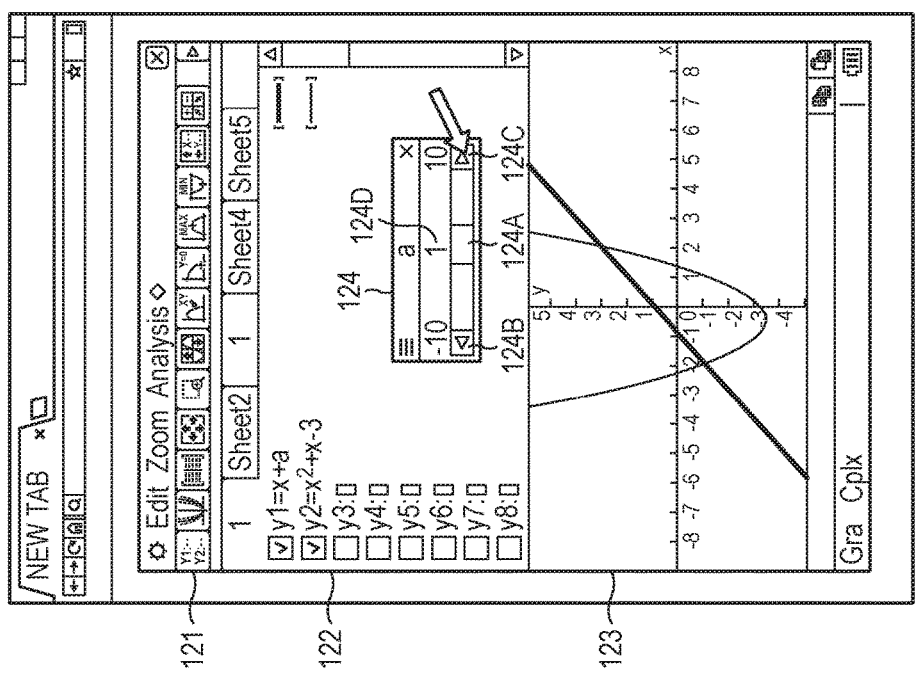

FIGS. 8A and 8B are views illustrating an example in which a constant included in a function expression is changed in the present embodiment.

In the function expression area 122 shown in FIGS. 8A and 8B, there are two input function expressions, and a first function expression (y1) includes a constant "a". In the case where the function expression includes the constant, the CPU 11 displays a constant operation area 124 for performing an operation of changing the constant value, as shown in FIGS. 8A and 8B, based on a displacement range and a current value stored in the constant-value storage area 12C in association with the constant included in the function expression.

In the constant operation area 124, the constant "a" included in the function expression is displayed, and numbers representing the current value the variation range are displayed. For example, in FIG. 8A, the current value "1" of the constant "a", and a lower limit value "−10" and an upper limit value "10" representing the variation range are displayed. Also, in the constant operation area 124, a slider 124A and buttons 124B and 124C for receiving user's operations for changing the constant value are provided. The slider 124A can be moved in the transverse direction, and can receive an instruction to decrease the constant value according to the amount of movement of the slider to the left, and can receive an instruction to increase the constant value according to the amount of movement of the slider to the right. The button 124B can receive an instruction to decrease the constant value, and the button 124C can receive an instruction to increase the constant value.

In a case of detecting that an operation to change the constant value included in the function expression (for example, an operation on the slider 124A) has been performed on the constant operation area 124 ("Yes" in STEP A9), the CPU 11 determines whether the coordinate data calculated with respect to the whole of the graph of the function expression having the changed constant has been received. For example, in a case where an option requiring calculation after change of a constant (a step value) has been performed with respect to the item "FIRST CONSTANT" during preliminary coordinate calculation setting ("Yes" in STEP A10), it is determined that the coordinate data of the graph corresponding to the function expression having the changed constant has been received. In this case, in STEP A16, the calculating device draws (generates) the graph corresponding to the function expression having the changed constant, instead of the unchanged graph, based on the received coordinate data arrangement.

Meanwhile, in a case where the coordinate data calculated with respect to the whole of the graph of the function expression having the changed constant has not been received ("No" in STEP A10), as described above, the CPU 11 changes the function expression data included in the coordinate calculation data 20 to the function expression having the changed constant, and requires the server 30 to perform calculation of the function expression. The CPU 11 receives the calculation result of the server 30 in STEP A15, and draws (generates) the graph based on a coordinate data arrangement corresponding to the graph after the change of the constant, in STEP A16. Also, the other detailed process is performed in the same way as that in the above-described case of changing the graph display range, and thus will not be described.

As described above, if the item "FIRST CONSTANT" is set to control the server 30 such that the server performs calculation of a changed function expression in case a constant is changed, during preliminary coordinate calculation setting, it is possible to efficiently generate highly accurate graphs based on graph coordinate data received in advance with respect to changed function expressions. FIG. 8B shows an example of a graph which is displayed in a case of the value of the constant "a" of the function expression shown in FIG. 8A.

Also, if the item "SECOND CONSTANT" is set to receive coordinate data of a changed range in advance in case a graph display range is changed, for example, even in a case where an operation to change the graph display range is performed on the graphs in the graph image area 123 shown in FIG. 8B, even with respect to the graph of the function expression having the changed constant "a", it is possible to efficiently generate a highly accurate graph.

Also, in a case where the items "FIRST CONSTANT" and "SECOND CONSTANT" have been set to their initial options, that is, in a case where coordinate data of a graph after the change of the constant value or the changed graph display range has not been received, as shown in FIGS. 6A to 6C, if an operation to change the constant value is performed or change of the graph display range is instructed, the server generates virtual coordinate data by performing simple calculation, as described above. Therefore, it is also possible to simply generate the graph. The CPU 11 receives necessary coordinate data from the server 30, and then generates a highly accurate graph based on the coordinate data calculated by the server 30, in place of the simply generated graph. In the above description, the constant included in the function expression has been described as an object; however, with respect to a coefficient value, it is also possible to perform the same process as the process related to the constant value.

Also, the methods described in the embodiment, that is, the methods of the processes shown by the flow charts of FIGS. 3 and 4 can be configured as a program, which can be executed in a computer, and be stored in recording media, such as memory cards (such as ROM cards and RAM cards), magnetic disks (such as flexible disks and hard disks), optical disks (such as CD-ROMs and DVDs), and semiconductor memories, to distributed. In this case, a computer can download the program recorded on an external storage medium, and control operations according to the program, thereby capable of realizing the same processes as the functions described in the embodiment.

Also, data on the program for realizing the methods can be transmitted in a program code form on a network (the Internet), and the program data can be loaded from a computer connected to the network (the Internet), thereby capable of realizing the same functions as those of the above-described embodiment.

Also, the present invention is not limited to the embodiments, and can be modified in various forms at the time of carrying out the invention, without departing from the gist of the present invention. In addition, the embodiments include inventions of various stages, and thus various inventions may be extracted by appropriate combinations of a plurality of disclosed constituent elements. For example, in a case of eliminating or combining some constituent elements from among all the constituent elements shown in the embodiments, configurations obtained by eliminating or combining some constituent elements may be extracted as inventions, as long as it is possible solving the problem described in the article "Problem that the Invention is to Solve" and achieving the effects described in the article "Advantage of the Invention".

What is claimed is:
1. A calculating device comprising:
a display;
a receiver-and-transmitter that is configured to communicate with a server, and
a processor, wherein the processor performs processes including:
detecting a size of the display;
setting a graph screen size for displaying graphs in a display screen of the display, based on the detected size;
determining a number of display dots on the display screen, corresponding to the set graph screen size;
transmitting (i) an increment of an independent variable per one display dot according to a variance range of the independent variable and the number of display dots on the display screen, (ii) a function expression of the independent variable, and (iii) the variance range of the independent variable, to the server,
receiving coordinate data of each display dot for generating a graph in a graph display range on the display screen, from the server; and
generating a graph image at each display dot of the graph display range based on the coordinate data, and displaying the generated graph image on the display screen of the display.
2. The calculating device according to claim 1, wherein:
the number of display dots on the display screen is acquired based on the number of display dots of the graph display range corresponding to the variance range of the independent variable.
3. A calculating device comprising:
a display;
a receiver-and-transmitter that is configured to communicate with a server; and
a processor,
wherein the processor performs processes including:
detecting a size of the display;
setting a graph screen size for displaying graphs in a display screen of the display, based on the detected size;
determining a number of display dots on the display screen, corresponding to the set graph screen size;
transmitting (i) the number of display dots on the display screen, (ii) a function expression, and (iii) a variance range of an independent variable, to the server;
receiving coordinate data of each display dot for generating a graph in a graph display range on the display screen, from the server; and
generating a graph image at each display dot of the graph display range based on the coordinate data, and displaying the generated graph image on the display screen of the display.
4. The calculating device according to claim 3, wherein:
the number of display dots on the display screen is acquired based on the number of display dots of the graph display range corresponding to the variance range of the independent variable.
5. The calculating device according to claim 1, wherein:
the processor further performs an operation including:
changing the graph display range, and in a case where all coordinate data corresponding to the variance range according to the changed graph display range is not received, the transmitting process transmits a part of the variance range in which coordinate data is insufficient, to the server.

6. The calculating device according to claim 5, wherein: the changing process moves the graph display range or changes a size of the graph display range.

7. The calculating device according to claim 5, wherein: the changing process changes a variation range of an independent variable in the graph display range.

8. The calculating device according to claim 1, wherein: in a case where the function expression includes a constant value, the transmitting process transmits a value in a variance range of the constant value, to the server.

9. The calculating device according to claim 1, wherein: the transmitting process transmits an option content set to request coordinate data of a range exceeding the graph display range.

10. The calculating device according to claim 1, wherein: in a case where coordinate values for generating a graph image in the graph display range is insufficient, the displaying process displays a graph image generated based on virtual coordinate values which correspond to insufficient coordinate values and which are calculated by simple calculation.

11. A graph display method of a calculating device which includes a display, the method comprising:
  detecting a size of the display;
  setting a graph screen size for displaying graphs in a display screen of the display, based on the detected size;
  determining a number of display dots on the display screen, corresponding to the set graph screen size;
  transmitting (i) an increment of an independent variable per one display dot according to a variance range of the independent variable and the number of display dots on the display screen, (ii) a function expression of the independent variable, and (iii) the variance range of the independent variable, to a server;
  receiving coordinate data of each display dot for generating a graph in a graph display range on the display screen, from the server; and
  generating a graph image at each display dot of the graph display range based on the coordinate data, and displaying the generated graph image on the display screen of the display.

12. The graph display method according to claim 11, wherein:
  the number of display dots on the display screen is acquired based on the number of display dots of the graph display range corresponding to the variance range of the independent variable.

13. A graph display method of a calculating device which includes a display, the method comprising:
  detecting a size of a display;
  setting a graph screen size for displaying graphs in a display screen of the display, based on the detected size;
  determining a number of display dots on the display screen, corresponding to the set graph screen size;
  storing a function expression of an independent variable;
  transmitting (i) the number of display dots on the display screen, (ii) the function expression, (iii) a variance range of an independent variable, and (iv) the number of display dots corresponding to a graph display range, to a server;
  receiving coordinate data representing positions for generating the graph in the graph display range, from the server; and
  generating a graph image at each display dot of the graph display range based on the coordinate data, and displaying the generated graph image on the display screen of the display.

14. The graph display method according to claim 1, wherein:
  in a case where the function expression includes a constant value, the transmitting process transmits a value in a variance range of the constant value, to the server.

15. A non-transitory storage medium which stores a program for controlling a processor of a calculating device having a display and a receiver-and-transmitter configured to communicate with a server, to cause the processor to perform operations comprising:
  detecting a size of the display;
  setting a graph screen size for displaying graphs in a display screen of the display, based on the detected size;
  determining a number of display dots on the display screen, corresponding to the set graph screen size;
  transmitting (i) an increment of an independent variable per one display dot according to a variance range of the independent variable and the number of display dots on the display screen, (ii) a function expression of the independent variable, and (iii) the variance range of the independent variable, to the server;
  receiving coordinate data of each display dot for generating a graph in a graph display range on the display screen, from the server; and
  generating a graph image at each display dot of the graph display range based on the coordinate data, and displaying the generated graph image on the display screen of the display.

16. The storage medium according to claim 14, wherein:
  the number of display dots on the display screen is acquired based on the number of display dots of the graph display range corresponding to the variance range of the independent variable.

17. A non-transitory storage medium which stores a program for controlling a processor of a calculating device having a display and a receiver-and-transmitter configured to communicate with a server, to cause the processor to perform operations comprising:
  detecting a size of the display;
  setting a graph screen size for displaying graphs in a display screen of the display, based on the detected size;
  determining a number of display dots on the display screen, corresponding to the set graph screen size;
  transmitting (i) the number of display dots on the display screen, (ii) a function expression, and (iii) a variance range of an independent variable, to the server;
  receiving coordinate data of each display dot for generating a graph in a graph display range on the display screen, from the server; and
  generating a graph image at each display dot of the graph display range based on the coordinate data, and displaying the generated graph image on the display screen of the display.

18. The storage medium according to claim 17, wherein:
  the number of display dots on the display screen is acquired based on the number of display dots of the graph display range on the screen corresponding to the variance range of the independent variable.

* * * * *

UNITED STATES PATENT AND TRADEMARK OFFICE
CERTIFICATE OF CORRECTION

PATENT NO. : 10,354,423 B2
APPLICATION NO. : 15/713603
DATED : July 16, 2019
INVENTOR(S) : Makoto Ozawa et al.

It is certified that error appears in the above-identified patent and that said Letters Patent is hereby corrected as shown below:

In the Claims

Column 16, Line 8, delete "claim 1" and insert -- claim 13 --.

Column 16, Line 39, delete "claim 14" and insert -- claim 15 --.

Signed and Sealed this
Twenty-fourth Day of December, 2019

Andrei Iancu
*Director of the United States Patent and Trademark Office*